US011354572B2

United States Patent
Moraitis et al.

(10) Patent No.: US 11,354,572 B2
(45) Date of Patent: Jun. 7, 2022

(54) MULTI-VARIABLES PROCESSING NEURONS AND UNSUPERVISED MULTI-TIMESCALE LEARNING FOR SPIKING NEURAL NETWORKS

(71) Applicant: International Business Machines Corporation, Armonk, NY (US)

(72) Inventors: Timoleon Moraitis, Glattpark (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 16/210,203

(22) Filed: Dec. 5, 2018

(65) Prior Publication Data

US 2020/0184325 A1 Jun. 11, 2020

(51) Int. Cl.
*G06N 3/04* (2006.01)
*G06N 3/06* (2006.01)
*G06N 3/08* (2006.01)
*G06N 3/063* (2006.01)

(52) U.S. Cl.
CPC ............... *G06N 3/08* (2013.01); *G06N 3/049* (2013.01); *G06N 3/0635* (2013.01)

(58) Field of Classification Search
CPC ........................... G06N 3/049; G06N 3/0635
See application file for complete search history.

(56) References Cited

U.S. PATENT DOCUMENTS

| 6,625,588 | B1 | 9/2003 | Haikonen |
| 9,213,937 | B2 | 12/2015 | Ponulak |
| 9,256,823 | B2 | 2/2016 | Sinyavskiy et al. |
| 9,767,408 | B1* | 9/2017 | Boybat Kara .......... G11C 11/54 |
| 9,830,709 | B2 | 11/2017 | Li et al. |
| 2014/0032458 | A1* | 1/2014 | Sinyavskiy ............ G06N 3/049 706/16 |
| 2014/0193066 | A1* | 7/2014 | Richert .............. G06K 9/00986 382/158 |
| 2014/0222739 | A1* | 8/2014 | Ponulak ................. G06N 3/049 706/25 |
| 2015/0178618 | A1 | 6/2015 | Nogaret |
| 2016/0110640 | A1* | 4/2016 | Arthur ................... G06N 3/063 706/25 |
| 2016/0283841 | A1 | 9/2016 | Sainath et al. |
| 2017/0286828 | A1* | 10/2017 | Smith .................... G06N 3/049 |
| 2018/0349508 | A1* | 12/2018 | Bequet ..................... G06N 3/04 |

(Continued)

OTHER PUBLICATIONS

Rachmuth, Guy, et al. "A biophysically-based neuromorphic model of spike rate-and timing-dependent plasticity." Proceedings of the National Academy of Sciences 108.49 (2011): E1266-E1274. (Year: 2011).*

(Continued)

*Primary Examiner* — Hal Schnee
(74) *Attorney, Agent, or Firm* — Scully, Scott, Murphy & Presser, P.C.; Daniel P. Morris (57) ABSTRACT

The present disclosure relates to a method of generating spikes by a neuron of a spiking neural network. The method comprises generating at each time, wherein the spike generation encodes at each time instant at least two variable values at the neuron. Synaptic weights may be optimized for a spike train generated by a given presynaptic neuron of a spiking neural network, wherein the spike train being indicative of features of at least one timescale.

25 Claims, 6 Drawing Sheets

(56) References Cited

U.S. PATENT DOCUMENTS

| | | | |
|---|---|---|---|
| 2019/0095778 A1* | 3/2019 | Buchanan | G06N 3/04 |
| 2019/0236443 A1* | 8/2019 | Koelmans | G06N 3/088 |
| 2019/0318242 A1* | 10/2019 | Kendall | G06N 3/082 |

OTHER PUBLICATIONS

Ngiam, J., et al., "Multimodal Deep Learning", Proceedings of the 28th International Conference on Machine Learning, Jun. 28-Jul. 2, 2011, 8 pages.

Wu, Z., et al., "Multi-Modal Hybrid Deep Neural Network for Speech Enhancement", arXiv:1606.04750v1 [cs.LG], Jun. 15, 2016, 6 pages.

Tzirakis, P., et al., "End-to-End Multimodal Emotion Recognition using Deep Neural Networks", Journal of Latex Class Files, Aug. 2015, 9 pages, vol. 14, No. 8.

Painkras, E., et al., "SpiNNaker: A 1-W 18-Core System-on-Chip for Massively-Parallel Neural Network Simulation", EEE Journal of Solid-State Circuits, Aug. 2013, pp. 1943-1953, vol. 48, No. 8.

Merolla, P.A., et al., "A million spiking-neuron integrated circuit with a scalable communication network and interface", Science, Aug. 8, 2014, pp. 668-673, vol. 14, Issue 6197.

Indiveri, G., et al., "Neuromorphic Architectures for Spiking Deep Neural Networks", IEDM15-69, Feb. 2016, pp. 4.2.1-4.2.4.

Guetig, R., et al., "Learning Input Correlations through Nonlinear Temporally Asymmetric Hebbian Plasticity", The Journal of Neuroscience, May 1, 2003, pp. 3697-3714, 23(9).

Diehl, P.U., "Unsupervised learning of digit recognition using spike-timing-dependent plasticity", Frontiers in Computational Neuroscience, Aug. 2015, pp. 1-9, vol. 9, Article 99.

Querlioz, D., et al., "Immunity to Device Variations in a Spiking Neural Network with Memristive Nanodevices", IEEE Transactions on Nanotechnology, May 2013, 8 pages, 12(3).

Tuma, T., et al., "Detecting correlations using phase-change neurons and synapses", IEEE Electron Device Letters, Manuscript received May 23, 2016, 4 pages.

Cui, Y., et al., "Continuous Online Sequence Learning with an Unsupervised Neural Network Model", Neural Computation, 2016, accepted Jul. 11, 2016, pp. 2474-2504, 28.

Moraitis, T., et al., "Fatiguing STOP: Learning from Spike-Timing Codes in the Presence of Rate Codes", arXiv:1706 05563v1, Jun. 17, 2017, 8 pages.

Trabelsi, C., et al., "Deep Complex Networks", arXiv:1705.09792v4, Feb. 25, 2018, Published as a conference paper at ICLR 2018, 19 pages.

Yamashita, Y., et al., "Emergence of Functional Hierarchy in a Multiple Timescale Neural Network Model: A Humanoid Robot Experiment", PLoS Computational Biology, Accepted Sep. 30, 2008, Published Nov. 7, 2008, 18 pages, vol. 4, Issue 11, e1000220.

* cited by examiner

MULTI-VARIABLES PROCESSING NEURONS AND UNSUPERVISED MULTI-TIMESCALE LEARNING FOR SPIKING NEURAL NETWORKS

BACKGROUND

The present disclosure relates to the field of computer systems, and more specifically, to a method for generating spikes by a neuron of a spiking neural network and a method for optimizing synaptic weights.

Neural networks are a computational model used in artificial intelligence systems. Neural networks are based on multiple artificial neurons. Each artificial neuron is connected with one or more other neurons, and links can enhance or inhibit the activation state of adjoining neurons. Artificial neurons are provided with a firing threshold that must be exceeded by a membrane potential of the neurons in order to generate a spike. This thresholding is a component of spiking neural network (SNNs).

SUMMARY

Various embodiments provide a method for generating spikes by a neuron of a spiking neural network, neuromorphic neuron, computer program product, synapse system and method for determining synaptic weights as described by the subject matter of the independent claims. Advantageous embodiments are described in the dependent claims. Embodiments of the present invention can be freely combined with each other if they are not mutually exclusive.

In one aspect, the invention relates to a method for generating spikes by a neuron of a spiking neural network, the method comprising generating spikes wherein the spike generation encodes at each time instant at least two variable values at the neuron. The at least two variable values may be received at or generated by the neuron.

In another aspect, the invention relates to a neuromorphic neuron apparatus, wherein the neuron apparatus is configured to generate spikes, the spike generation being configured to encode two variables at each time instant.

In another aspect, the invention relates to a synapse system for optimizing (or determining) synaptic efficacies for weighting spike trains generated by presynaptic neurons of a spiking neural network, the spike trains encoding information in different timescales, wherein for each presynaptic neuron of the presynaptic neurons and for each timescale of the timescales the system is configured to tune a respective plastic synaptic efficacy for weighting an input spike and providing the weighted input to a postsynaptic neuron of the network.

In another aspect, the invention relates to a method for optimizing synaptic weights for a spike train generated by a given presynaptic neuron of a spiking neural network, the spike train being indicative of features of at least one timescale, the method comprising: for a timescale of the timescales tuning a respective time- and input-dependent synaptic efficacy for weighting the presynaptic spikes and providing the weighted presynaptic spikes into a respective postsynaptic neuron of the network.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure enables a mixed neural coding which may allow a group of neurons to encode several different types of spike-based data. This may enable neural networks with increased information content. By increasing the number of variables that can be represented within a neural network of a given size, the present method may lead to improvements in the network's performance.

The present method may enable to decrease the number of neurons per network compared to standard, single-variable neuron networks. This could be reflected in a significant decrease in energy needed to perform the network's task in hardware or software, as well as a decrease in the size of hardware implementations. This may enable embedding more powerful neural networks in devices with power or size constraints.

The present neurons may particularly be advantageous when provided with a learning algorithm that is able to capture the information encoded by the neurons. For that, the synapse system of the present disclosure may enable a computational primitive for unsupervised learning from multiple timescales. The synapse system may be used as part of network architectures that are already powerful but limited in tasks of sequence learning, in that supervision is needed or multi-timescale learning is problematic. This may significantly expand the applicability of SNNs to previously inaccessible tasks, as most data is sequential, contains multiple timescales, and is unlabeled. For example, an apparatus implementing a SNN may be provided, wherein each neuron of at least part of the neurons of the SNN may be provided with the synapse system in order to tune the synaptic weights using spikes generated by the each neuron. The learning may be achieved by use of a variety of temporal dynamics within synapses of the synapse system.

According to one embodiment, the two variables are encoded by the neuron in an instantaneous rate of spike generation and in the timing of each generated spike. The instantaneous rate may, for example, be determined by the neuron based on the value of one variable of the two variables. The information of the one variable is encoded in the instantaneous rate. The rate is instantaneous in that the rate depends on the variable value that is received at a given instant by the neuron.

According to one embodiment, the timing of the spike is determined by a degree of synchrony of the neuron's spikes to other spikes of other neurons of the spiking neural network. The degree of synchrony may, for example, be a predefined degree of synchrony. This may enable encoding of the variable values while considering the correlation of spike timing across neurons. The correlation coefficients of the neurons can be mapped to an analog scalar, such as the brightness level of an image's pixels. This mapping can thus be used for determining the synchronies.

According to one embodiment, the generation of the spikes comprises: in each time-bin of duration dt using a reference Poisson process for performing a Bernoulli trial of probability of success proportional to the instantaneous rate and the duration dt, and based on a predefined global source of randomness; wherein the neuron at the given time bin generates a spike with probability $\theta_k = P(X_k(t)=1|\text{ref}^{X_k(t)}=1) = R_k dt + \sqrt{c_k}(1-R_k dt)$ if the neuron's reference Bernoulli trial in the given bin is successful or probability $\phi_k = P(X_k(t)=1|\text{ref}^{X_k(t)}=0) = R_k dt(1-\sqrt{c_k})$ otherwise, where ck is a synchrony coefficient that determines the spike timing and Rk is the determined spike rate of the neuron k. Thus, at each point in time, the probability of spike generation depends on the neuron's synchrony and is conditional on the reference Poisson process which depends on a spike rate that is specific to each neuron and a source of random numbers that is common to all neurons. The common random number allows introduction of synchrony between the neurons, while permitting different rates and synchrony coefficients.

According to one embodiment, the neuron is configured to generate a spike in accordance with rates for encoding respective values of a first property of a given object, and to generate a spike in accordance with timings for encoding respective values of a second property of the object, the generating comprising: determining one of the rates and timings for spike generation of the two variable values; wherein the generated spikes have both the determined timing and the determined rate.

According to one embodiment, the generation of the spikes results in a spike train having a rate and timing that are indicative of a first and second property respectively.

According to one embodiment, the two variables are two properties of an object.

According to one embodiment, the object is a pixel of an image. According to one embodiment, the two variables are color and brightness.

When used at an input layer of a network, the present neurons can be applied at a variety of dual data types such as the example of both color and brightness of bimodal images. But other possible applications include stereoscopic images used in three-dimensional visuals, or pairs of completely disparate modalities, such as image and sound. The same mixed neural coding could also or alternatively be used in the hidden or the output neurons of the network, i.e. neurons other than the input neurons, in which case the two variables would represent more abstract features.

According to one embodiment, the plastic synaptic efficacy comprises a synaptic weight W(t) and a short-term function F(t), wherein the synapse system comprises a first apparatus associated with a given pair of presynaptic and postsynaptic neurons of the presynaptic and postsynaptic neurons, the first apparatus comprising a long-term synaptic plasticity component for tuning the synaptic weight W(t) and a short-term synaptic plasticity component for tuning the short-term function F(t). The efficacy is a weight. It is named "efficacy" because the increase in the value of the efficacy may induce an increase in the firing probability and thus a firing efficiency of a postsynaptic neuron that receives inputs weighted by the efficacy. Optimizing the efficacies or the weights comprises determining the efficacies. Determining the efficacies may for example be iteratively performed, wherein in each iteration, changes to the weights of the (immediately) previous iteration are determined. In the first execution (i.e. before the first iteration) changes to predefined initiated weights may be performed for determining the weights of the first execution.

The first apparatus may be referred to as a synapse as it is connecting two neurons namely the presynaptic neuron and the associated or respective postsynaptic neuron. The synapse system may thus comprise multiple synapses. This may enable efficient implementations in hardware.

This embodiment may enable to process data features of short timescales separately from but simultaneously with those features of long timescales. This is particularly advantageous as temporal or spatiotemporal data often include features in multiple timescales. Features of the short timescale may be represented by individual spikes, and features of the long timescale may be represented by multi-spike sequences of longer patterns, such as in the spike rate.

According to one embodiment, the system is further configured for optimizing the synaptic efficacy for another pair of presynaptic and postsynaptic neurons of the network, the system further comprising a second apparatus associated with the other pair, the second apparatus comprising a short-term synaptic plasticity component and a long-term synaptic plasticity component. The short-term synaptic plasticity component of the second apparatus is different from the short-term synaptic plasticity component of the first apparatus. In one example, the other pair and the given pair may share the same presynaptic neuron or same postsynaptic neuron. This may particularly be advantageous if the second and the first apparatuses are connected to respective different postsynaptic neurons. This embodiment may be advantageous as the learning of the network can benefit from a variability in the plasticity parameters of the synapses, which could take advantage of the natural variability in the analog electronic elements used in neuromorphic hardware. For example, the first apparatus is configured to use a first plasticity rule for performing the tuning, and the second apparatus is configured to use a second plasticity rule for performing the tuning, wherein the first and second plasticity rules are different. For example, the first plasticity rule is a STDP rule and the second plasticity rule is a FSTDP rule.

According to one embodiment, the short-term synaptic plasticity component of the second apparatus is inactive.

In case a postsynaptic neuron receives the weights from the first and second apparatuses, the short-term synaptic plasticity component of the second apparatus may be the same as the short-term synaptic plasticity component of the first apparatus.

According to one embodiment, wherein the long-term synaptic plasticity component is configured to determine changes to the respective synaptic weight W(t) depending on the time distance in pairs of presynaptic and postsynaptic spikes of the given pair, wherein the short-term synaptic plasticity component is configured to determine changes to the respective short-term function F(t) depending on the time of arrival of presynaptic spikes. In one example, the short-term synaptic plasticity component is configured to determine changes to the respective short-term function F(t) depending on the time distance in pairs of presynaptic and postsynaptic spikes of the neurons of the given pair.

In one example, the short-term function F(t) may be a short-term depression or fatigue effect to the weight W(t) such that the values of G(t) are smaller than W(t). For example, F(t) may increase temporarily when a presynaptic input spike arrives, so that if the next spike arrives soon after, i.e., when the instantaneous input rate increases, its postsynaptic effect is decreased. According to one embodiment, G(t)=W(t)(1−F(t)).

According to one embodiment, F(t)=1−1/(R(t)+1), wherein R(t) is a spike rate at time t.

According to one embodiment, F(t)=f(t−$t^{sP_n}$)+F($t^{sP_n}$), wherein f is a decreasing function. t is time, $t^{sP_n}$ is the time of arrival of the most recent presynaptic spike, and F ($t^{sP_n}$) is the value of F immediately before the most recent presynaptic spike.

According to one embodiment, $$f(x) = \begin{cases} a, & 0 < x < x_{window} \\ 0, & x \geq x_{window} \end{cases}, a \in (0, 1].$$

According to one embodiment, $f(x)=1-ax$, $a>0$ or $f(x)=1-ae^{-x}$, $a>0$.

In another example, the short-term function F(t) may be a short-term facilitation to the weight W(t) such that the values of G(t) are larger than W(t). In this case, F(t) may be used to provide a facilitation effect that is the opposite effect of fatigue. For example, short-term increases in presynaptic inputs induce short-term changes in the function F(t) such that the plastic synaptic efficacy G(t) is increasing in the short-term. According to one embodiment, G(t)=W(t)·F(t). For example, F(t)=1/(R(t)+1).

According to one embodiment, the postsynaptic neurons form an ensemble of interconnected neurons, wherein the connections between neurons in the ensemble are not plastic.

According to one embodiment, the given neuron is a neuron of the preceding embodiments. Each of the neurons, e.g. of an input layer, used for learning may be configured to generate at each time instant spikes that encode at least two variable values received at the neuron.

According to one embodiment, the long-term component is configured to use a spike timing dependent plasticity (STDP) rule for performing the tuning The first apparatus may be configured to use a fatiguing STDP or a facilitating STDP rule for tuning or optimizing the plastic synaptic efficacy or a STDP rule for tuning the synaptic weight W(t). In the latter case, the short term component may be inactive.

Each of the neuromorphic neuron apparatus and the synapse system may be implemented using a neuromorphic hardware implementation. For example, each of neuromorphic neuron apparatus (or neuron) and the synapse system may be a circuit using memristors to implement at least part of the present disclosure. The memristive neuron can comprise a memristor that resets its state when it reaches a threshold value, each reset representing a spike. The neuron may receive two input signals, one signal modulating the rate of the produced spikes as measured in a time window, and another signal modulating the exact timing of the produced spikes. The neuron may alternatively be implemented by using analog or digital CMOS circuits. For example, the spikes may be produced by a capacitor that discharges when it reaches a threshold. In both cases, the randomness required to implement some aspects of the disclosure of the multi-dimensional neuron, can be applied for example to randomly tune the firing threshold around a mean value, or to tune one or both of the input signals. The randomness may be provided by the inherently random variability of CMOS or memristive components.

According to one embodiment, the first apparatus or the synapse system comprises a transistor having a gate input, wherein the spike trains are input into the gate so as to modify the amount of current passing through the transistor.

According to one embodiment, modifying the amount of current passing through the transistor is in accordance with a FSTDP rule or a facilitating STDP rule.

According to one embodiment, the first apparatus or the synapse system comprises a non-volatile memory element with volatile characteristics that match a form of fatigue or facilitation. The form of fatigue refers to fatiguing of the weight W(t) such that the values of G(t) can become smaller than W(t). The form of facilitation refers to facilitation of the weight W(t) such that the values of G(t) can become larger than W(t).

According to one embodiment, the first apparatus or the synapse system comprises a digital CMOS circuit or an analog CMOS circuit.

Figure 1A:
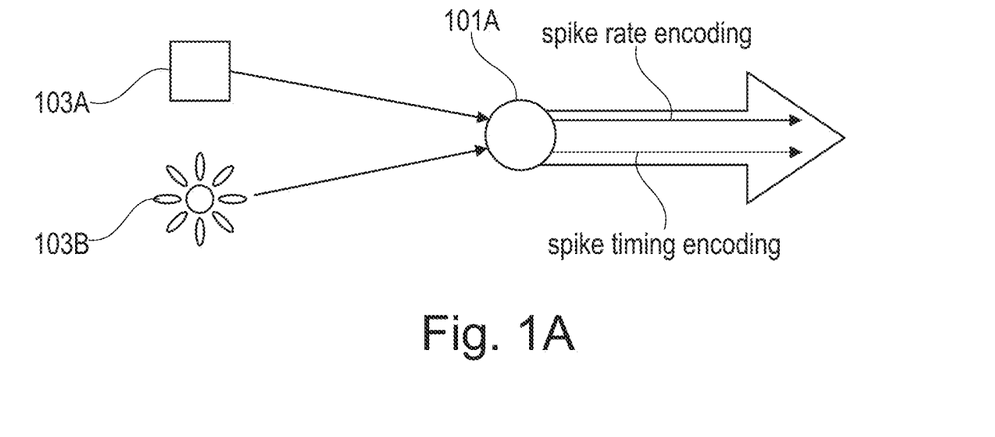
FIG. 1A illustrates a neuromorphic neuron in one embodiment in accordance with the present disclosure.

FIG. 1A illustrates a neuromorphic neuron 101A in accordance with the present disclosure. The neuron 101A may be part of a spiking neural network (SNN).

The neuron 101A may, for example, be configured to perform a rate-based coding. The rate coding encodes information in the rate of the generation of the spikes i.e. the firing rate is the basis of information. The neuron 101A may represent (or generate spikes for) a scalar variable such as the gray-scale color of a pixel. For example, the range of gray-scale values that can be represented by the neuron 101A may be mapped to a range of rates between a minimum rate $R_{min}$ and a maximum rate $R_{max}$. Furthermore, the neuron 101A may be configured to perform a timing-based coding (also referred to as temporal coding). The timing-based coding encodes information in the timing of the spikes i.e. the exact spike timing is the basis of information.

The neuron 101A is configured to receive more than one variable value in accordance with present disclosure. The received variable values may be indicative of properties of an object such an image. For example, the neuron 101A is configured to generate spikes to encode values of two variables at each time instant in the generated spikes. In this case, the neuron 101A may be referred to as a two-dimensional (2D) neuron. As exemplified in FIG. 1A, the neuron 101A may receive two variable values 103A and 103B. The variable values 103A-B may, for example, be two properties of a pixel of an image such as the color and brightness as illustrated in FIG. 1A.

To enable the neuron 101A to represent more than one variable, a mixed coding may be used. This mixed coding may be applied to encode images with at least two modalities such as a color and brightness. For example, in case of two variables, the mixed coding may include a combination of a rate coding and timing-based coding. The mixed coding may be enabled, because the rate coding operates at a slower timescale than time-based coding, and it does not determine a unique choice of the individual spikes that make up the rate-coded pattern e.g. different sets of individual spikes may be used for providing the rate pattern of a same variable value. In other terms, the same rate value may be obtained by different sets of individual spikes. The rate defined by a selected set of individual spikes that would also comprise a spike having a timing that encodes the other variable value may be used for spike firing. The rate and timing-based coding are inter-compatible such that the probability that the neuron 101A spikes at any point in time is dependent on the neuron's instantaneous rate and spike timings.

For performing the mixed coding, the neuron 101A may modulate both its rate and the timing of individual spikes in order to provide a spike that can be used to indicate both a timing and a rate of spiking of the neuron 101A. The rate and timing may be modulated separately but simultaneously. For example, knowing the rate that would encode information of a variable and the timing of an individual spike that would encode the information of another variable, the neuron 101A may be configured to identify the distribution of the individual spikes over time that would represent both that rate and that timing.

Thus, using the mixed coding, the neuron 101A may generate spikes that that have both a desired timing and a desired rate, wherein the desired timing and desired rate may encode respective values of the two received variables at the neuron 101A.

Figure 1B:
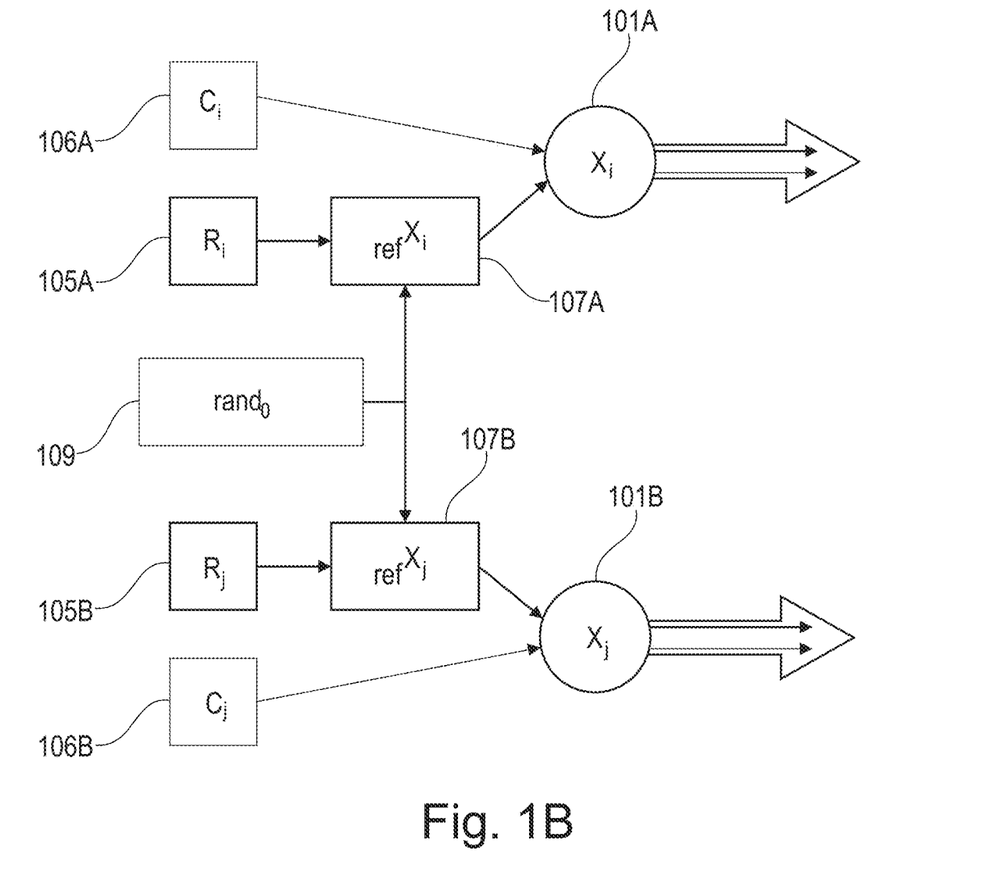
FIG. 1B depicts neurons of a network layer of a SNN for implementing an example mixed coding in one embodiment in accordance with the present disclosure.

FIG. 1B depicts neurons of a network layer of a SNN for implementing an example mixed coding in accordance with the present disclosure. FIG. 1B shows two neuromorphic neurons 101A and 101B for exemplification, but is not limited to. Each of the neurons 101A-B may be configured to receive more than one variable value as and to operate as described with reference to FIG. 1A.

Each of the neurons 101A-B may be configured to perform a mixed coding including a rate based coding and timing-based coding, wherein the timing-based coding is based on neural spike synchrony. The timing-based coding may, for example, be configured to modulate a neural synchrony for determining the timing of the spikes to be generated. This correlation-based temporal coding may allow for a separate modulation of the rate. The spike synchrony may be generated by correlating the neurons (including 101A-101B) of the SNN to each other. That is, the synchrony may be measured using the correlation between spike trains of the neurons e.g. 101A-B. For example, the synchrony may be a correlation coefficient between two neurons' spike trains when the two rates of the spike trains are equal. The pairwise correlation between neurons increases monotonically with synchrony ck. Synchrony ck is not equal to the standard pairwise correlation coefficient. For instance, two neurons i and j with ci=cj=1 but different rates Ri≠Rj, by definition do not have a pairwise correlation coefficient cij that is equal to 1. Each of the lower-rate neuron's spikes is fully synchronous with a spike of the higher-rate neuron, but there are additional spikes produced by the higher-rate neuron, which are uncorrelated. For this reason ck is named the neuron's synchrony coefficient. The synchrony coefficient of a neuron can encode information by being mapped to, or computed from an analog scalar variable, such as the brightness level of the pixel of an image. Correlation coefficients may, for example, range from $C_{min}=0$ to $C_{max}=1$. For example, the neuron 101A-B may be provided with a mapping of brightness levels and associated synchrony coefficient C. The SNN may thus comprise neurons that represent high brightness levels and having high values of the synchrony coefficient e.g. close to 1. These neurons may be referred to as high-valued neurons. The SNN may further comprise neurons representing low brightness levels and having low values of the synchrony coefficient e.g. close to 0. These neurons may be referred to as low-valued neurons. The high-valued neurons may be synchronized with each other while the low-valued neurons produce spikes that asynchronous.

Using the mixed coding, the neurons 101A-B may, for example, encode images, by varying their rate in the range $R_{min}$-$R_{max}$ and synchrony in the range $C_{min}$-$C_{max}$ based on received values of the color and brightness respectively. For tuning both the synchrony and the rate of each neuron, a separate reference 107A-B may be used for each neuron 101A-B which allows different rates—but a common source of randomness 109 for each reference—which introduces correlation and synchrony. Specifically, as shown in FIG. 1B, for each neuron k (101A-B) there is a reference Poisson process $ref^{Xk}$ 107A-B of rate $R_k$ 105A-B, that performs Bernoulli trials at each time bin dt. The Bernoulli experiment involves generating a random number using the source 109 from a continuous uniform distribution between 0 and 1: rand0~U[0;1] and comparing this to $R_k$dt. $R_k$ is the instantaneous rate (of the range $R_{min}$-$R_{max}$) associated with a given variable value received at the neuron k. In other terms, the probability of spike release may be determined at each time bin dt for each neuron, but conditional on the reference 107A-B that is specific to each neuron k, as are the rate and the synchrony coefficient. The neuron 101A or 101B generates at the given time bin a spike with probability $\theta_k=P(X_k(t)=1|ref^{X_k(t)}=1)=R_kdt+\sqrt{c_k}(1-R_kdt)$ if the neuron's reference Bernoulli trial in the given bin is successful or with probability $\phi_k=P(X_k(t)=1|ref^{X_k(t)}=0)=R_kdt(1-\sqrt{c_k})$ otherwise. ck 106A-B is a synchrony coefficient (of the range $C_{min}$-$C_{max}$) that determines the spike timing and $R_k$ is the spike rate of the neuron k. The possibility to influence both the rate $R_k$ 105A-B and the timing through synchrony ck 106A-B, allows associating two scalar variables to two concurrent but different timescales in a neuron's activity.

Figure 2:
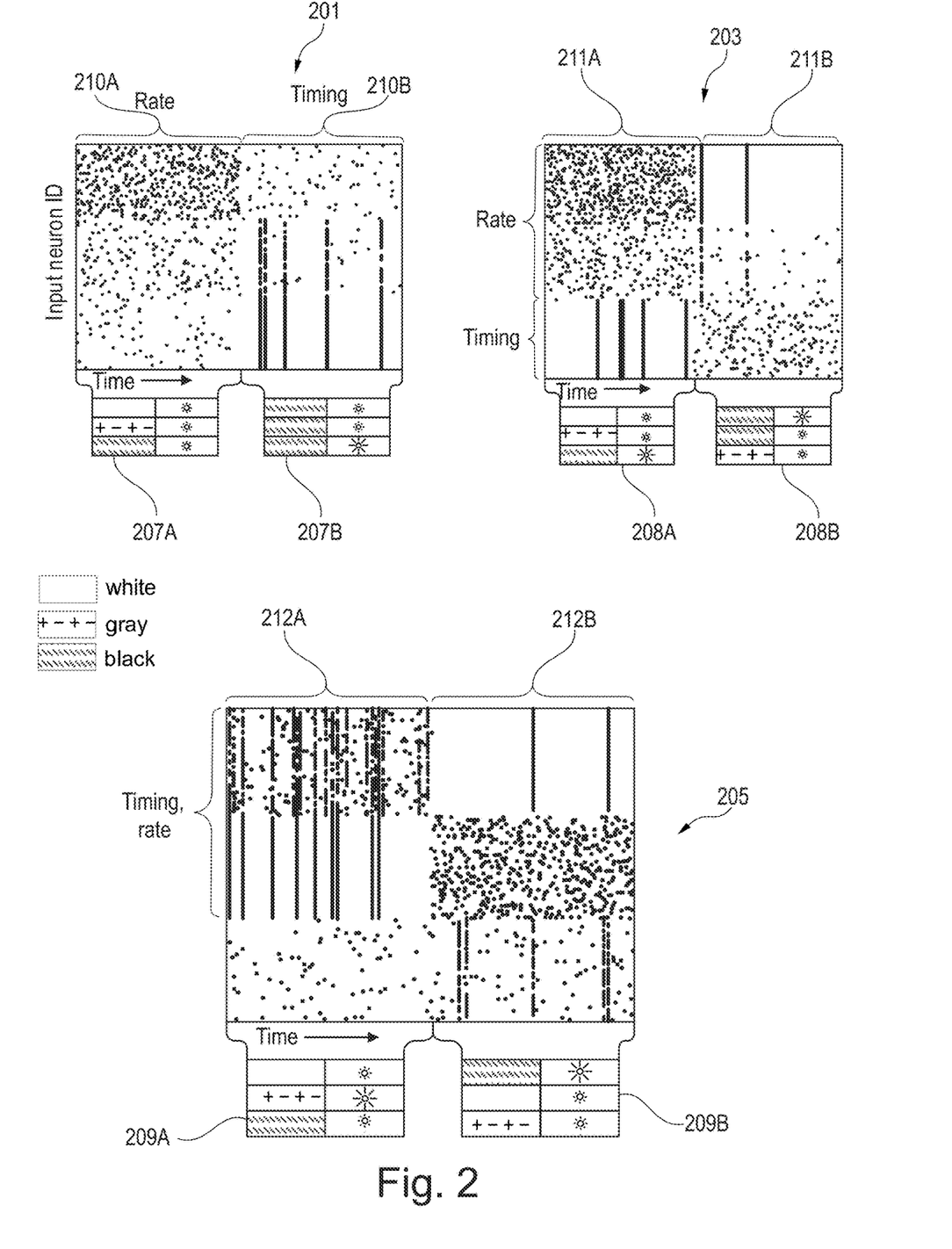
FIG. 2 illustrates results of the application of the mixed coding for encoding bimodal images in one embodiment.

FIG. 2 illustrates results of the application of the mixed coding for encoding bimodal images with neurons such as neurons 101A-B.

Neurons such as neurons 101A-B described with reference to FIG. 1 or 2 may be used in an input layer of a SNN to encode an illustrative example of data. Specifically, two visual properties of a pixel, e.g. gray-scale color and brightness are used as two input variables of the neurons of the input layer.

As described above, the spectrum of gray-scale color values may, for example, be mapped to a range of rates between $R_{min}$ and $R_{max}$. For example each neuron of the SNN may be provided with a map that associates a rate of spiking that can be used for rate coding of each gray-scale value and another map associating the synchrony coefficient to the brightness value to temporally encode the brightness.

FIG. 2 shows three panels 201, 203 and 205. Each panel comprises two images 207A-B, 208A-B and 209A-B and a raster plot. The raster plot indicates whether a neuron of the vertical axis has fired or not depending on the time in the horizontal axis of the plot and the value of the respective pixel of the image that was encoded at that time.

The example images 207A-B, 208A-B and 209A-B of FIG. 2 comprise each 10×10 pixels. Each pixel may have both a color and a brightness variable, or only one of the two, in which case the other variable's value is zero. Both variables of each pixel are associated with one neuron, so that 100 neurons are used in the input layer of the SNN. To illustrate the two types of visual features, each image is split into two components, one showing the color and one showing the brightness of the pixels. The examples shown are images with three horizontal stripes, and all pixels within each stripe have the same color and the same brightness.

In each of the panels 201, 203, and 205, each half of the horizontal time axis is occupied by spikes that encode one image. For example, the horizontal time axis 210A-B are indicative of spikes that encode images 207A and 207B respectively. The horizontal time axis 211A-B are indicative of spikes that encode images 208A-B respectively. The horizontal time axis 212A-B are indicative of spikes that encode images 209A-B respectively.

Each panel 201-205 concerns different levels of mixing the color with brightness. Panel 201 shows two images 207A-B that use both color and brightness coding, but each image is purely color coded or brightness-coded, which are achieved by a uniform lack of synchrony across neurons, and a uniform baseline firing rate respectively. The image 207A is purely color coded and the image 207B is purely brightness coded. As shown in the raster plot of panel 201, 100 neurons produce a short spike-based dataset that contains both a rate-coded pattern in the horizontal time axis 210A and a temporally-coded pattern in the horizontal time axis 210B.

In panel 203, each image 208A-B contains both color and brightness information, but each pixel of an image contains only one of the two properties. Each of the two patterns shown in the horizontal time axis 211A-B respectively contains both rate and temporal coding concurrently.

In panel 205, bimodal images 209A-B are used where some pixels contain both color and brightness simultaneously. Individual neurons of panel 205 use concurrently both rate and temporal coding in accordance with the present disclosure. For instance, in the horizontal time axis 212A the neurons in the middle of the population are fully synchronous and have a mid-range spike rate, while the upper part of the population, has a mid-range synchrony value and a high rate.

As shown in panel 205, the neurons are able to successfully represent two-dimensional data based on the mixed rate-based and temporal coding. This increase in information content without increasing the computational resources needed is achieved by using the continuous time operation of spiking neurons as a previously unused resource, and exploiting the fact that different timescales can encode different information simultaneously or alternatingly.

The example of FIG. 2 indicates that the present method may enable to encode several different types of spike-based data which can be categorized according to the level at which the temporal coding is mixed with the rate coding. The least level of mixing is the dataset level (as shown in panel 201), whereby for some duration the data is rate-coded and some other is temporally-coded, but rate and temporal coding may not occur simultaneously. At the intermediate level, pattern-level mixing (as shown in panel 203), rate and temporal coding are mixed simultaneously within a duration that encodes a pattern through simultaneous rate and temporal coding by the ensemble of neurons. In this case, a subset of the neurons within the pattern is rate-coded, while a different subset is temporally-coded. At the pattern level of mixed coding, the subset of rate-coded neurons may not overlap with the temporally coded subset. At the most entangled level of mixing (as shown in panel 205), there is overlap between the groups of rate- and temporally-coded neurons, i.e., some neurons are individually both rate-coded and temporally-coded simultaneously.

Figure 3A:
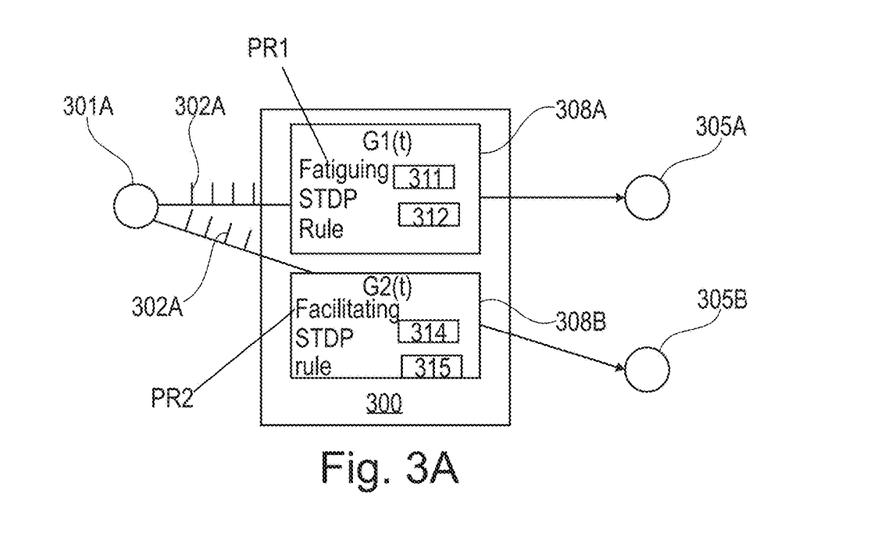
FIG. 3A depicts an example synapse system for optimizing synaptic weights in one embodiment.
Figure 3B:
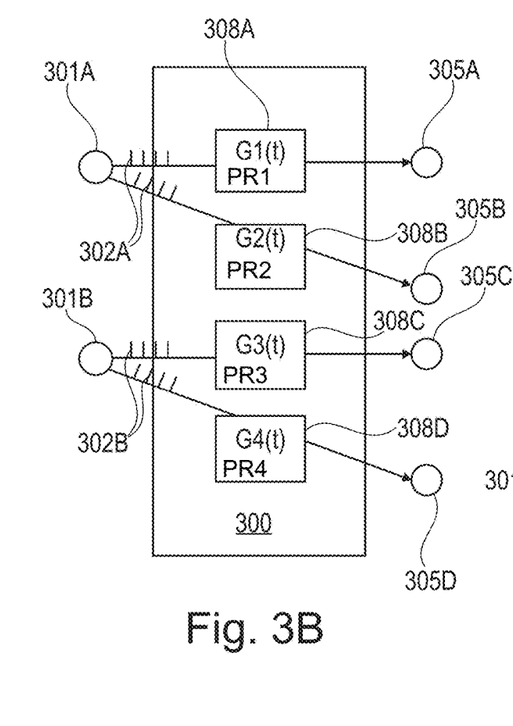
FIG. 3B depicts another example synapse system for optimizing synaptic weights in one embodiment.
Figure 3C:
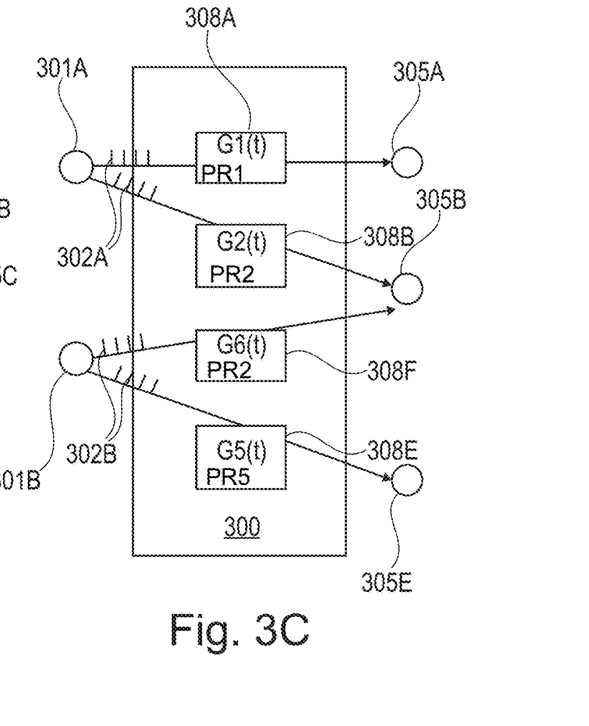
FIG. 3C depicts another example synapse system for optimizing synaptic weights in one embodiment.
Figure 4:
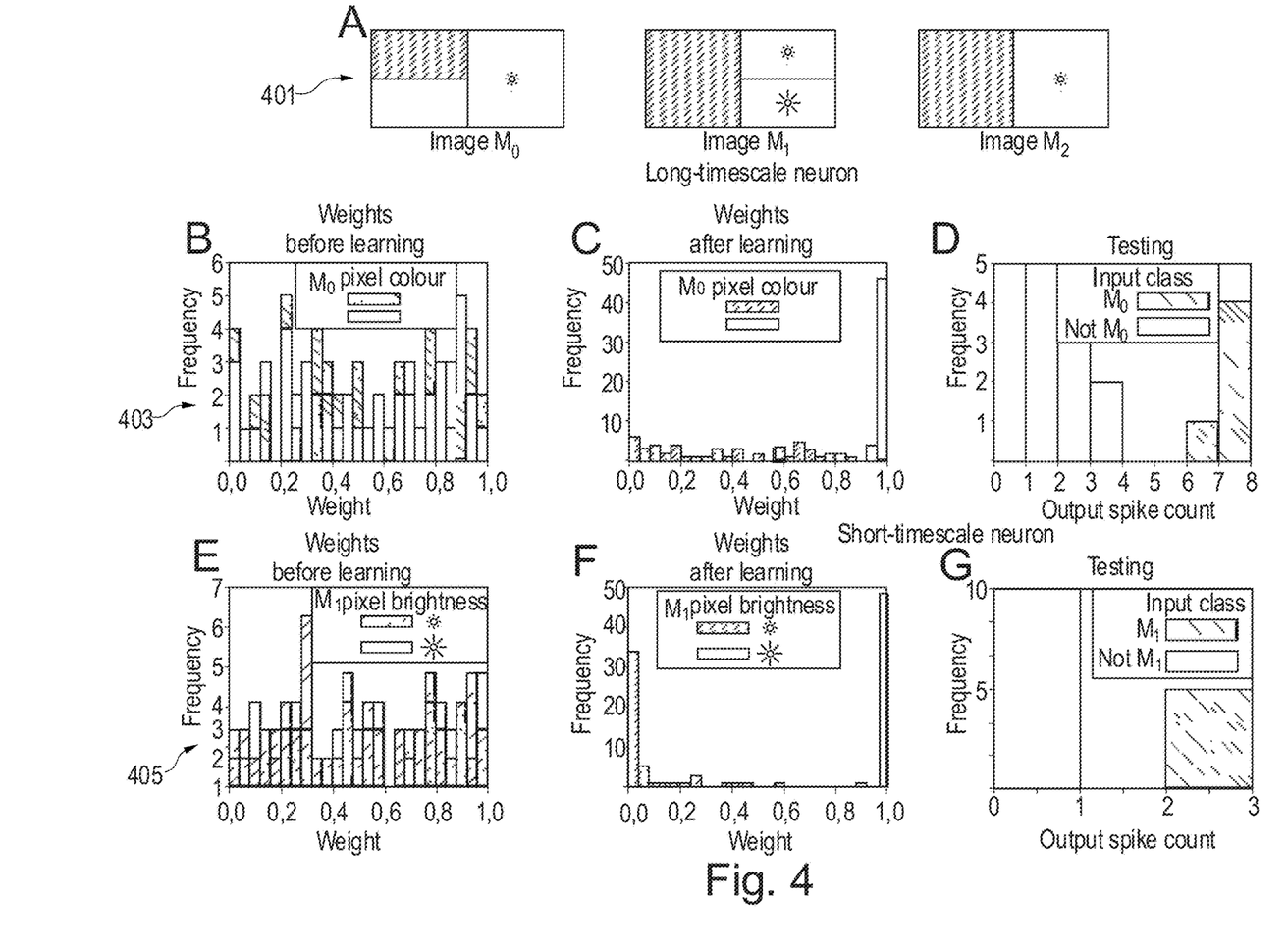
FIG. 4 depicts an example unsupervised classification of multi-timescale sequences that encode bimodal images in one embodiment.
Figure 5A:
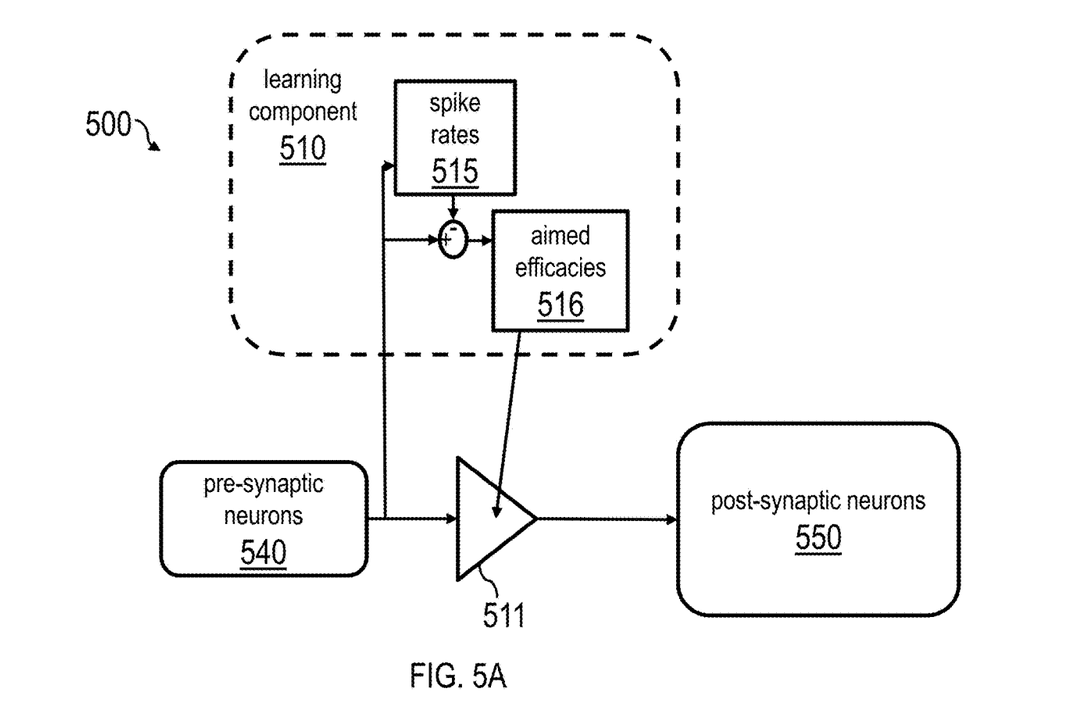
FIG. 5A illustrates a circuit implementing a neural network with a learning rule with a rate-discounting element, according to an embodiment of the present invention.
Figure 5B:
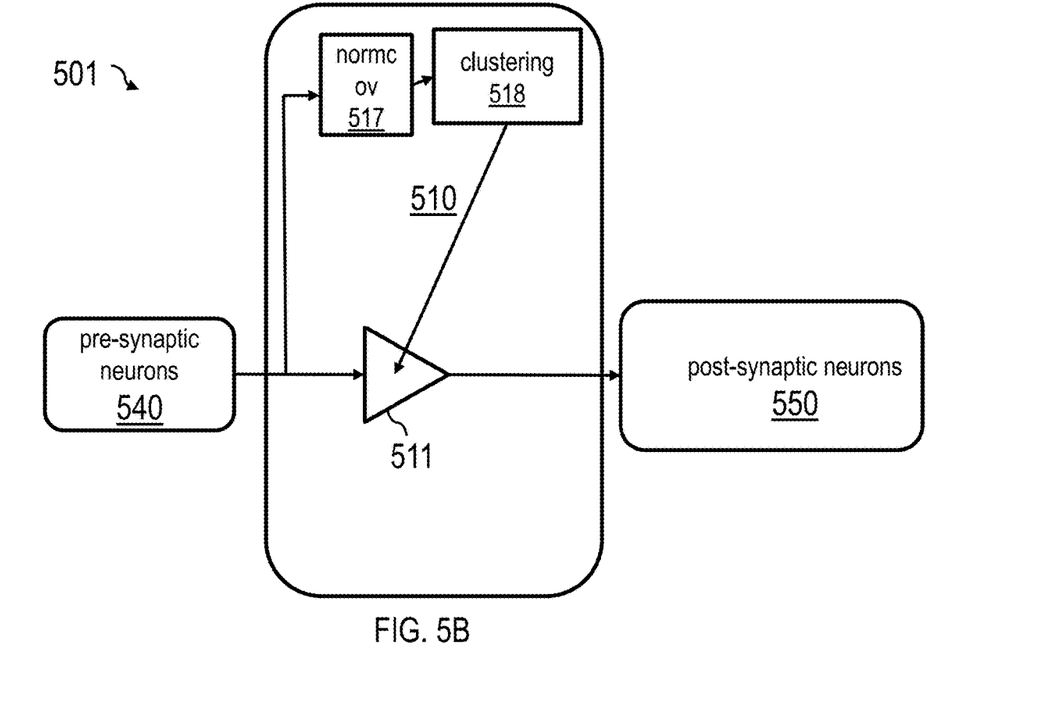
FIG. 5B illustrates a circuit implementing a normcov-based learning neural network, according to an embodiment of the present invention.
Figure 5C:
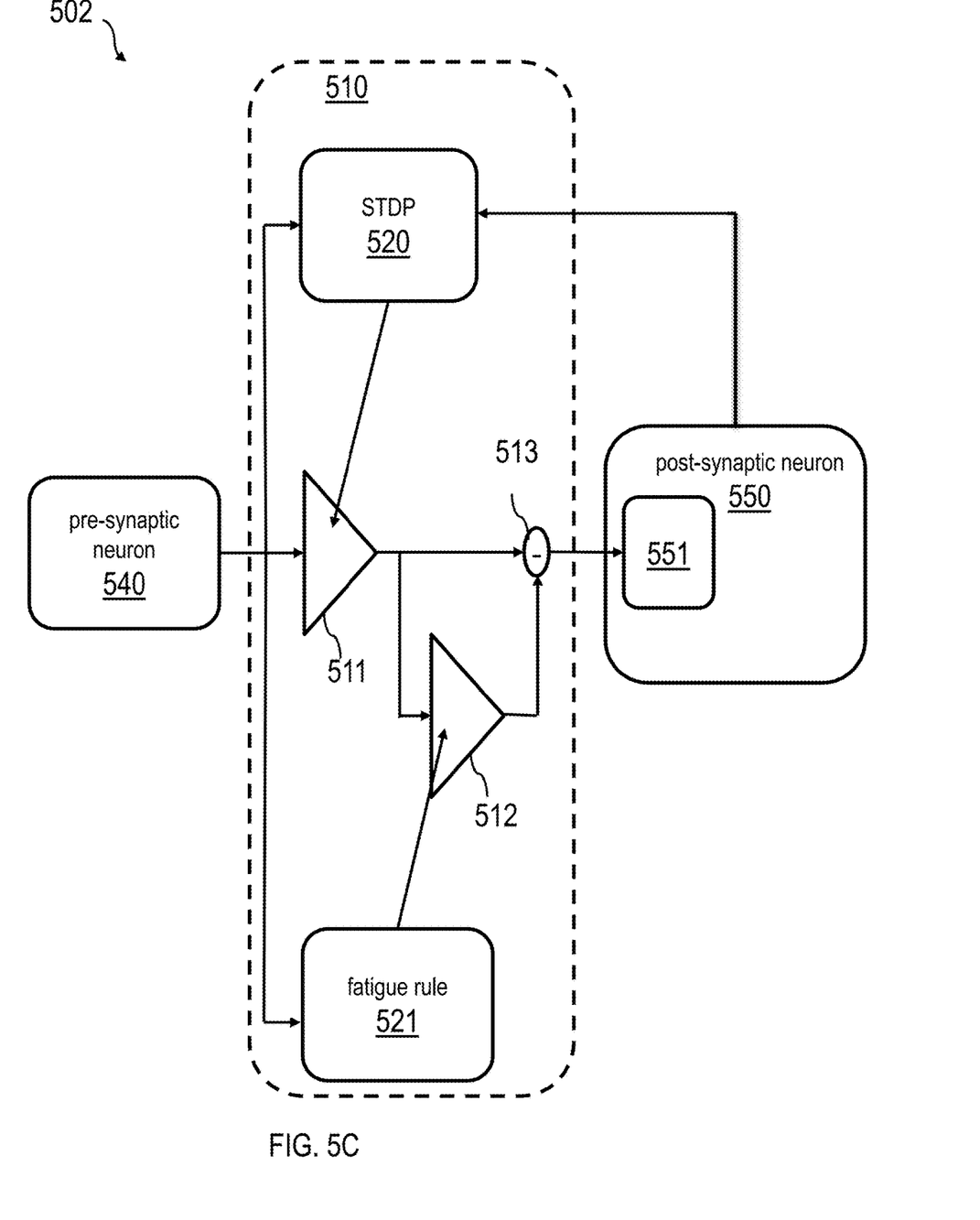
FIG. 5C illustrates a circuit implementing an FSTDP synapse, according to an embodiment of the present invention.

The mixed coding as described herein may be used in conjunction with a learning rule that can operate and learn from multiple timescales in an unsupervised manner as described herein e.g. with reference to FIGS. 3-5.

FIG. 3A depicts an example synapse system 300 for optimizing synaptic weights.

The synapse system 300 may be used to learn from sequences with multiple timescales in an unsupervised way. In one example, spatiotemporal data may be provided as multiple parallel continuous analog signals to the synapse system 300. Digital or temporally discrete sequences could also be used similarly as input for the synapse system 300. The synapse system 300 may be configured to use spike based coding. For example, a change dx of input signal amplitude that is associated with a shortest relevant timescale dt (referred to as short timescale) in each sequence is encoded as a unitary event or spike. Therefore, a longer duration may be composed by multiple spikes. For example, patterns with temporal features of the short timescale dt are represented by the timing of spikes in the input sequences. In each of the input sequences, patterns of a timescale longer than dt (long timescale) can be described by the number of spikes within a longer temporal window of size Dt, or, equivalently, the spike rates. In this way, the timing of individual spikes is significant, as well as the context of spike rate in which they appear. Therefore, learning to recognize patterns of both timescales can be approached as learning both correlations of spike timings and correlations of spike rates. The spike-based coding allows to make use of SNNs, and, in particular, spike-timing-dependent plasticity (STDP) which enables SNNs to perform unsupervised learning.

As shown in the example of FIG. 3A, spike trains 302A are generated by a presynaptic neuron 301A of a spiking neural network. The spike trains 302A may, for example, be generated as described above using the mixed coding scheme. The spike trains 302A encode information of different timescales e.g. two timescales. The different timescales comprise, for example, a short timescale and a long timescale. The synapse system 300 is configured to receive the spike trains 302A and to use the received spike trains for the learning. The synapse system 300 may be configured to perform an unsupervised learning by tuning a synaptic weight W(t). In case the learning data is encoded in both spike rate and timing, an unsupervised plasticity rule may dominantly lead to a rate-based learning. This may enable to learn from a single timescale only. In order to learn from different timescales, the synapse system 300 is configured to tune plastic synaptic efficacies G(t) that can be adapted based on plasticity rules that vary per synapse of the synapse system. This is indicated in FIG. 3A, wherein the apparatus 308A is configured to use a learning rule such as a fatiguing STDP learning rule referred to as PR1 to tune the efficacy G1(t) and the apparatus 308B is configured to use a different learning rule such as a facilitating STDP rule referred to as PR2 to tune the efficacy G2(t).

In one example, the plastic synaptic efficacy G(t) is provided in different forms (e.g. a form of G(t) may be the formula of G(t)) such that more than one timescale may be learned. G(t) may be obtained by adding a short-term depression to the weight W(t) such that the values of G(t) can become smaller than W(t). This may enable an unsupervised learning on time-coding when rate-coding is also present. Another G(t) may be obtained by adding a short-term facilitation to the weight W(t) such that the values of G(t) can become larger than W(t). In this example, the difference between forms of G(t) is a qualitative difference because the short-term plasticity is changing the efficacy in different directions and it enables learning from completely different timescales.

In another example, the difference between efficacies G(t) may be a quantitative difference in that G(t) may have a same form but with variables scales of the same form e.g. stronger versus weaker scale or slower versus faster scale.

For that, the synapse system 300 comprises for each pair of presynaptic and postsynaptic neurons an apparatus (or synapse) 308A-B. The apparatus 308A may, for example, be configured to perform a learning to recognize patterns of short timescales. The apparatus 308A is configured to tune a respective plastic synaptic efficacy G1(t). The plastic synaptic efficacy G1(t) is a combination of a synaptic weight W(t) and a short-term function F(t). The apparatus 308A comprises a long-term synaptic plasticity component 311 for tuning the synaptic weight W(t) and a short-term synaptic plasticity component 312 for tuning the short-term function F(t). The apparatus 308B may, for example, be configured to perform a learning to recognize patterns of long timescales. The apparatus 308B is configured to tune a respective plastic synaptic efficacy G2(t). As with the apparatus 308A, the apparatus 308B comprises a long-term synaptic plasticity component 314 for tuning the synaptic weight W(t) of the respective G2(t) and a short-term synaptic plasticity component 315 for tuning the short-term function F(t) of the respective G2(t).

The plasticity rule of G1(t) and G2(t) may be chosen different so as to configure the synapse system 300 to tune the efficacies G1(t) and G2(t) for different timescales. For example, G1(t) and G2(t) may have different forms as follows: $G1(t)=W(t)\cdot[1-F(t)]$, and $G2(t)=W(t)\cdot F(t)$, wherein for each form a respective different plasticity rule may be used. This may enable the qualitative difference. In another example, G1(t) and G2(t) may have the same form as follows $W(t)\cdot[1-F(t)]$ but different functions F(t) (variable scale) e.g. $F(t)=1-1/(R(t)+1)$ for G1(t), wherein R(t) is a spike rate at time t or F(t)=0 for G1(t) and $F(t)=F(t)=f(t-t^{sp_{n-1}})+F(t^{sp_{n-1}})$ for G2(t). This may enable a quantitative difference. F(t)=0 means that the short-term synaptic plasticity component 315 is inactive.

In case $G2(t)=W2(t)$ and G1(t) is W1(t) with short-term depression, the apparatus 308B may use the STDP learning rule to tune the efficacy G2(t). W1(t) and W2(t) are synaptic weights W(t) which are indexed to indicate that W1(t) and W2(t) are tuned by the long term components 311 and 315 of the apparatus 308A and 308B respectively. The STDP learning rule is a long-term synaptic plasticity rule, i.e. a learning rule whereby weight updates are persistent. STDP is also a plasticity rule that is local to the synapses, i.e. the updates of synaptic weights are based only on immediate pre- and post-synaptic spikes, as opposed to global optimization schemes, like error backpropagation. The STDP learning rule determines changes to the synaptic weight depending on the time distance in pairs of presynaptic and postsynaptic spikes, i.e. those in the synaptic input and those in the output of the neuron 305A to which the STDP synapse provides input. Unsupervised learning of networks having synapse systems and neurons as described herein is possible because postsynaptic spikes occur when a pattern of input spikes activates the neuron enough, and this is then fed back into the synaptic plasticity or weights. STDP learning rule can be used to learn from the spike timing in temporally-coded data, or it can be used with rate-coded data. However, when both spike timing and rate patterns exist in the input, the rate-based, long timescale may dominate STDP based learning, hence obstructing learning from the short, timing-based timescale. And, the apparatus 308A may use a Fatiguing STDP (FSTDP) learning rule that focuses the network's learning on the spike timing despite any concurrent rate patterns. The apparatus 308A may be referred to as a FSTDP synapse. FSTDP synapses operate by making use of short-term plasticity, specifically short-term depression, also called synaptic fatigue. Synaptic fatigue is the abrupt decrease of the synaptic efficacy G(t) following each spike, and its subsequent transient recovery, observed in biology as the depletion and gradual replenishment of synaptic neurotransmitter vesicles. FSTDP learning rule can be used to implement normcov-based learning, whereby synaptic weights are clustered according to their normalized covariance, i.e. the covariance of the inputs after these inputs are normalized by a measure of their rate in a recent time window of a given length. For example, FSTDP rule can be used to implement spike-timing-based learning that discounts rate-correlations. This FSTDP learning rule normalizes the effect of each spike on the postsynaptic neuron by the spike rate context in which it occurs, and thus minimizes the influence of spike rates on unsupervised learning.

The synapses with the fatiguing type of short-term plasticity focus the learning on the short timescale. In this disclosure, to allow learning in the network from multiple timescales, varying plasticity rules across the synapses of the synapse system may be used. The rules may vary in terms of plasticity types, such as short-term facilitation and short-term depression or fatigue, and/or strengths, and/or time constants. For example, the synapse system in accordance with the present disclosure enables more postsynaptic neurons per timescale and more timescales per postsynaptic neuron.

In this case, where the synaptic plasticity varies across the synapses, the learning may be such that clusters synaptic weights according to their normalized covariance again, but whereby the normalization of each input's contribution to the calculated normalized covariance is performed by varying factors with varying dependences on the rate of the input, and with the rates calculated differently, for example over windows of different durations.

FIGS. 5A and 5B provide example implementations of the apparatuses 308A and 308B in case G(t)=W(t). FIG. 5C provides an example implementation of the apparatuses 308A and 308B in case G(t) is different from W(t).

FIG. 3B depicts another example synapse system 300 for optimizing synaptic weights for spike trains 302A and 302B generated by presynaptic neurons 301A and 301B of a spiking neural network.

As with neuron 301A, the neuron 301B may be associated with apparatus 308C for tuning the plastic synaptic efficacy G3(t) and apparatus 308D for tuning the plastic synaptic efficacy G4(t) for providing the efficacies to respective postsynaptic neurons 305C-D of the network. Each of the apparatuses 308A-D may use a respective plasticity rule PR1-4. Each pair of apparatuses of apparatuses 308A-D may or may not have same plasticity rule PR1-4.

In one example, the pair of G3(t) and G1(t) may be tuned using the same rule e.g. PR1 and the pair G4(t) and G2(t) may be tuned another same rule e.g. PR2. In this case, the long and short-term components of the apparatus 308A may be the same as the long and short-term components of the apparatus 308C. And, the long and short-term components of the apparatus 308B may be the same as the long and short-term components of the apparatus 308D.

In another example, the pair of G3(t) and G1(t) may be tuned using the same rule PR1 and the pair of G4(t)=W4(t) and G2(t) may be tuned using different rules e.g. PR1 for G4(t) and PR2 for G2(t). In this case, the long and short-term components of the apparatus 308A may be the same as the long and short-term components of the apparatus 308C. And, the long-term component of the apparatus 308B may be the same as the long-term component of the apparatus 308D. The short-term component of the apparatus 308D is inactive.

These examples indicate that the present disclosure may enable a flexible method and system to learn from different timescales with different synapses.

FIG. 3B shows only two presynaptic neurons for exemplification purpose. However, more than two presynaptic neurons e.g. N may be processed as described herein e.g. each presynaptic neuron may be associated with a respective one or more apparatuses (such as apparatus 308A) connecting it to the respective one or more postsynaptic neurons. The at least N apparatuses may each have a short and long-term component as described herein. At least part of the N short-term components may be different as described above. In another example, a predefined potion of the N short-term components may be inactive.

FIG. 3C depicts another example synapse system 300 for optimizing synaptic efficacies for spike trains 302A and 302B generated by presynaptic neurons 301A and 301B of a spiking neural network.

As with neuron 301A, the neuron 301B may be associated with apparatus 308F for tuning the plastic synaptic efficacy G6(t) and apparatus 308E for tuning the plastic synaptic efficacy G5(t) for providing the efficacies to respective postsynaptic neurons 305B and 305D of the network. That is, the postsynaptic neuron 305B may be associated with two apparatuses 308B and 308F. FIG. 3C indicates that the apparatuses 308F and 308B use the same plasticity rule PR2 and thus apparatus 308F may have the same long and short components as apparatus 308B. In this example, the two apparatuses 308B and 308F are connected to the same postsynaptic neuron. In other terms, a neuron has the same short-term plasticity component among its input synapses.

The synaptic system 300 is configured to perform an unsupervised multi-timescale learning using the short and/or long-term components as described with reference to FIGS. 3A-C.

FIG. 4 depicts an example of unsupervised classification of multi-timescale sequences that encode bimodal images. FIG. 4 shows the result of the unsupervised multi-timescale learning with the network as described herein e.g. in FIGS. 3A-C and FIGS. 1A-B.

The first row 401 of FIG. 4 shows different input images M0, M1 and M2. Each image's dimensions are 10 pixels×10 pixels, and each pixel is characterized by a color value and a brightness value. M0 is a color-coded image having 50 white colored pixels and 50 black colored pixels, all of the same brightness value and M1 is a brightness-coded image, with uniform color. M2 is all-black and of minimum brightness image. This may enable to obtain e.g. using the 2D neurons, three classes of spiking data each representing a different image M0, M1 and M2. For example, multi-timescale spiking data may be generated with the 2D neurons (e.g. as described in FIGS. 1A-B) to encode bimodal images of color and brightness such as images M0, M1 and M2. The unsupervised multi-timescale learning may be used to classify the multi-timescale spiking data.

The dimensions of the images of FIG. 4 are 10×10 pixels, so that 100 2D neurons may be used at the input layer of a SNN network. Each 2D neuron of the network may receive two values of the color and the brightness of a respective pixel. The 2D neuron may be configured to generate spikes as described above with reference to FIGS. 1-2 in order to encode the two values in the generated spikes. For example, the exact spike timing of the generated spikes may indicate the brightness of the pixel and the firing rate of the generated spikes indicates the color of that pixel. This may result in image M0 being encoded in a long rate-based timescale and the image M1 being encoded in a short timing-based timescale. For example, brightness may be represented in a short timescale dt of the spiking data, e.g. by the timing of individual spikes. A long timescale can, for example, be described by the number of spikes within a longer temporal window of size $\Delta t$, longer than dt, or, equivalently, the rate measured in window $\Delta t$, which here represents the pixel's color value. In this way, the timing of individual spikes is significant, as well as the context of spike rate in which they appear.

The SNN may be formed of 100 2D neurons (presynaptic neurons) and the two output neurons. One output neuron may receive weights from short-term components of the 100 neurons and the other output neuron may receive weights from long-term components of 100 neurons. The output neuron that is connected to the long-term components (STDP synapses) may be referred to as the long timescale neuron (or rate-based neuron). The output neuron that is connected to the short-term components (FSTDP synapses) may be referred to as the short timescale neuron (or timing-based neuron).

The use of varying short-term plasticity between different synapses (e.g. STDP and FSTDP synapses) was chosen to permit the network to learn from both timescales, instead of being driven by a dominant timescale, as could be the case if only STDP were used. The present learning may be advantageous due to its use of synapses with varying short-term plasticity in the same network, and its application on multi-timescale data.

The second row 403 of FIG. 4 shows graphs B, C and D for the long-timescale neuron. The third row 405 of FIG. 4 shows graphs E, F and G for the short-timescale neuron.

All weights are initialized randomly and uniformly. Graphs B and E show (with dashed and non-dashed histogram bars) the initial weight distribution of the input synapses to the long-timescale and the short-timescale neurons respectively. Dashed and white (non-dashed) histogram bars in graphs B and C correspond to synapses (short and long-term components) receiving input from black and white pixels respectively of spiking data class of image M0, having low and high spike rate respectively. Dashed and non-dashed bars in graphs E and F correspond to pixels with low and high brightness of spiking data class of image M1, having a low and high spike synchrony respectively.

The SNN is trained using 20 examples of each class of the classes, interleaved randomly. Successful learning for the rate-based neuron was expected to potentiate its synapses which correspond to white pixels for the color coded image M0. This is what the post-learning synaptic weight distribution indeed shows in graph C. Similarly, for the timing-based neuron, successful learning caused potentiation of its high-brightness (high-synchrony) synapses as shown in graph F. Graphs C and F show the training results comprising the weight distributions of the long-timescale and the short-timescale neurons after training or learning with 20 examples of each image M0, M1 and M2.

Furthermore, the trained network's classification performance is tested by presenting it 5 test images of each class and counting the output neurons' spikes. The histograms of their activity indicate 100% classification accuracy on these data, as each neuron responds strongly to either M0 or M1 but not both and not M2 (cf. graphs D and G). Graphs D and G show the output of the two output neurons during testing with 5 images of each class. The long-timescale neuron responds with more than 5 output spikes to the presentation of M0 and less than that to other images. The short-timescale neuron is active when image M1 is presented, and only then.

The emerged difference in the weight distribution and the output of the neurons are underlined by the ability of the network's learning to be driven by both two timescales in the input without supervision. This result indicates the ability of a spiking network to learn in an unsupervised manner from data with multiple timescales. The fact that the multi-timescale dataset used for the demonstration was encoded by the 2D neurons shows that the mixed coding used by the 2D neurons is possible to be both processed and learned by a SNN.

FIG. 5A illustrates a network (SNN) 500 learning from spike inputs while discounting the influence of input spike rates, according to an embodiment of the present invention. The network 500 comprises at least one pre-synaptic neuron 540, at least one post-synaptic neuron 550. The network 500 can learn temporal correlations in input spikes from the pre-synaptic neuron regardless of the input rates. Each input has timed spikes and may have added rate-dependent spikes. Some inputs are spike-timing-correlated.

The network 500 comprises an apparatus 510 having a long-term synaptic weight component. The long-term component may comprise a spike-rate component 515 and at least one synapse 511. The long-term component outputs a set of aimed synaptic weights 516 during operation of the network. The spike-rate component 515 computes the rates of the presynaptic input spikes. The long-term component sets the aimed weights 516 according to the input spikes after discounting the spike-rate component 515.

Learning a task from a spike-timing code consists of learning to detect the temporal correlations across the streams that carry the code. Therefore, in a spiking neural network, the neurons need to learn to associate the strongly covarying inputs. This can be well illustrated as the discovery of clusters of high covariance in the covariance matrix of the input synapse pairs. In STDP, a neuron approximates this by potentiating, i.e., strengthening, and depressing, i.e., weakening, the synapses whose input shows high and low covariance respectively with the neuron's own output, i.e. the weighted sum of the input streams. This is a good approximation because inputs that covary strongly with the neuron's output which they drive likely covary strongly with one another. So covariances between inputs define the learning task, and covariances of the inputs with the sum of all inputs set a prediction for the neuron's optimal approximation to the task. The neuron's STDP synapses compare the inputs directly with the neuron's output, so a neuron's learning is sensitive specifically to the uncentered covariance of the inputs. If in addition to the covariances introduced by the correlations in timings of individual spikes there are covariances introduced by correlations in the rates of the inputs, these rate-induced covariances dominate the uncentered covariance, because of the spurious correlations of individual spike timings that are added by the slower covarying rates. To detect the fast covariances in the presence of the slow ones, individual spikes from high-rate channels may contribute less to the computed covariance than those from low-rate channels.

FIG. 5B illustrates a network 501 configured with an apparatus 510 having a long-term synaptic plasticity component that outputs the aimed synaptic weights according to clusters found in the normalized covariance (normcov) matrix of the inputs, according to an example of the present disclosure. In this example, the normcov component 517 of the long-term component calculates the normcov. The output of the normcov component 517 is then clustered by a clustering component 518 of the long-term component, which modifies the at least one synapse component 511. The normcov component 517 computes the normcov and sets the synaptic weight component 511 according to clusters found in the normalized covariance (normcov) matrix of the inputs. At least one pre-synaptic neuron 540 and at least one post-synaptic neuron 550 are connected to the at least one synapse 511. For a neuron to learn a spike-timing code in the presence of a rate code, a modified STDP rule is needed to be implemented by the long-term component. This rule should approximate the learning of covariances of rate-normalized inputs via learning the covariances of rate-normalized inputs with the neuron's own output. The normalization factors may vary across inputs or across synapses, such that some inputs are normalized by a factor that is inversely related to the rate, or by dependence on differently measured rates, for instance measured over windows of varying lengths.

FIG. 5C illustrates a circuit 500 implementing an FSTDP synapse, according to an embodiment of the present disclosure. In this circuit, a presynaptic neuron 540 is connected to an apparatus 510 such as apparatuses 308A and 308B. The apparatus 510 is connected to the post-synaptic neuron 550. The pre-synaptic neuron generates a series of spikes. The spikes are received by a weight component 511 (e.g. which is at least part of component 311) of the apparatus 510. The output of the synaptic weight component 511 is received at the input of the fatiguing synaptic weight component 512 (which is at least part of component 312). The output of the fatiguing component 512 is subtracted from the output of the spike timing dependent plasticity component 511 at the difference component 513. The output of the difference component is received in the membrane potential 551 of the post-synaptic neuron 550.

The apparatus 510 may comprise a STDP rule component 520 and fatigue rule component 521. The apparatus 510 may thus be referred to as FSTDP synapse as it combines the components 520-521.

The STDP rule component 520 may modify the weight component 511 according to the timing of spikes from the pre- and the post-synaptic neurons. The fatigue rule component 521 modifies the fatiguing component 512 according to the function F(t). In the absence of presynaptic spikes, F tends to zero as t tends to infinity and thus, $G(t) \rightarrow W(t)$. F(t) can be implemented, in an example, in a spike-based way as a function that increases its value by a fixed amount upon the arrival of a presynaptic spike and decays exponentially. Values of W(t) may be stored in a resistive memory. The synaptic fatigue causes the synaptic efficacy to be given by $G(t)=W(t)[1-F(t)]$, where G(t) is the efficacy, W(t) denotes the stored synaptic weight, and F(t) is a function that depends on the time of arrival of the presynaptic spikes.

In a different aspect, a similar apparatus with both long-term and short-term plasticity, but wherein the short-term component increases the efficacy when the presynaptic spike rate increases, can be included in an implementation of the invention. In this case the synapse will focus its learning on longer timescales, discounting the influence of individual spike timings on learning.

For example, each of the synapse system 300 and apparatus 510 may be a circuit. The circuit may, for example, be implemented using software simulations or hardware emulations. SNNs with any variation and combination of synaptic rules can be simulated in software on a variety of hardware platforms, such as CPU based systems, including architectures like SpiNNaker (Painkras et al., 2013), GPU based systems, or AI accelerators with synaptic dynamics. Simulated learning that updates programmable synapses on neuromorphic hardware can also be used. Learning simulated off-chip, as in IBM TrueNorth (Merolla et al., 2014) or CxQuad (Indiveri et al., 2015).

The hardware implementation may, for example, be performed in neuromorphic hardware with spike-timing-dependent long-term dynamics and with depressing or increasing short-term synaptic dynamics, either in analog CMOS or digital CMOS. A phase change memory or resistive memory, combined with transistors, may implement the generation of the weights W(t) and G(t). A signal provided to the gate of a transistor, as part of each pre-synaptic spike, can shape the amount of current passing through, according to a learning or plasticity rule (e.g. STRDP rule, FSTDP rule or facilitating STDP rule) defined by additional synaptic circuitry on-chip, or off-chip. Additionally, a non-volatile memory element with volatile characteristics that match a form of fatigue or facilitation. Volatility used for short-term fatiguing or facilitating effect, non-volatility for long-term STDP weight update. A non-volatile memory may be used for storing W(t) and a volatile memory may be used for storing F(t) or G(t).

Various embodiments are specified in the following numbered clauses.

1. A synapse system for optimizing synaptic efficacies for weighting spike trains generated by presynaptic neurons of a spiking neural network, the spike trains encoding information in different timescales, wherein for each presynaptic neuron of the presynaptic neurons and for each timescale of the timescales the system is configured to tune a respective plastic synaptic efficacy for weighting an input spike and providing the weighted input to a postsynaptic neuron of the network.

2. The system of clause 1, wherein the plastic synaptic efficacy G(t) comprises a synaptic weight W(t) and a short-term function F(t), wherein the synapse system comprises a first apparatus associated with a given pair of presynaptic and postsynaptic neurons of the presynaptic and postsynaptic neurons, the first apparatus comprising a long-term synaptic plasticity component for tuning the synaptic weight W(t) and a short-term synaptic plasticity component for tuning the short-term function F(t).

3. The system of clause 2, the system being further configured for optimizing the plastic synaptic efficacy for another pair of presynaptic and postsynaptic neurons of the network, the system further comprising a second apparatus associated with the other pair, the second apparatus comprising a short-term synaptic plasticity component and a long-term synaptic plasticity component.

4. The system of clause 3, wherein the short-term synaptic plasticity component of the second apparatus is different from the short-term synaptic plasticity component of the first apparatus.

5. The system of clause 3, wherein the short-term synaptic plasticity component of the second apparatus is inactive.

6. The system of clause 3, wherein the first and second apparatuses are associated with a same postsynaptic neuron, wherein the short-term synaptic plasticity component of the second apparatus is the same as the short-term synaptic plasticity component of the first apparatus.

7. The system of clause 3, wherein the other pair of neurons comprises the presynaptic neuron of the pair of neurons.

8. The system of clause 2, wherein the long-term synaptic plasticity component is configured to determine changes to the respective synaptic weight W(t) depending on the time distance in pairs of presynaptic and postsynaptic spikes of the given pair, wherein the short-term synaptic plasticity component is configured to determine changes to the respective short-term function F(t) depending on the time of arrival of presynaptic spikes.

9. The system of clause 8, wherein short-term increases in presynaptic inputs induce short-term changes in the function F such that the plastic synaptic efficacy G(t) is decreasing or increasing in the short-term.

10. The system of clause 9, wherein $G(t)=W(t)(1-F(t))$.

11. The system of clause 10, wherein $F(t)=1-1/(R(t)+1)$, wherein R(t) is a spike rate at time t.

12. The system of clause 11, wherein $F(t)=f(t-t^{sp_n})+F(t^{sp_n})$, wherein f is a decreasing function wherein t is time, $t^{sp_n}$ is the time of arrival of the most recent presynaptic spike, and $F(t^{sp_n})$ is the value of F immediately before the most recent presynaptic spike.

13. The system of clause 12, wherein $$f(x) = \begin{cases} a, & 0 < x < x_{window} \\ 0, & x \geq x_{window} \end{cases}, a \in (0, 1].$$

14. The system of clause 12, wherein $f(x)=1-ax$, $a>0$ or $f(x)=1-ae^{-x}$, $a>0$.

15. The system of clause 8, wherein short-term decreasing presynaptic inputs induce short-term changes in the short-term function F such that the plastic synaptic efficacy G(t) is increasing in the short term.

16. The system of clause 15, wherein $G(t)=W(t)\cdot F(t)$.

17. The system of clause 16, wherein $F(t)=1/(R(t)+1)$, wherein R(t) is a spike rate at time t.

18. The system of clause 1, wherein the postsynaptic neurons form an ensemble of interconnected neurons, wherein the connections between neurons in the ensemble are not plastic.

19. The system of clause 1, wherein the presynaptic neuron is a neuron of claim 10.

20. The system of clause 2, wherein the long-term component is configured to use a spike timing dependent plasticity (STDP) rule for performing the tuning.

21. The system of clause 3, wherein the first apparatus is configured to use a first learning rule for performing the tuning, wherein the second apparatus is configured to use a second learning rule for performing the tuning, wherein the first and second learning rules are different.

22. The system of clause 21, wherein the first learning rule is STDP rule and the second learning rule is a FSTDP rule.

23. The system of clause 8, wherein the short-term synaptic plasticity component is configured to determine changes to the respective short-term function F(t) synaptic weight depending on the time distance in pairs of presynaptic and postsynaptic spikes of the neurons of the given pair.

24. The system of clause 2, wherein the first apparatus comprises a transistor having a gate input, wherein the spike trains are input into the gate so as to modify the amount of current passing through the transistor.

25. The system of clause 24, wherein modifying the amount of current passing through the transistor is in accordance with a FSTDP rule or a facilitation STDP rule.

26. The system of clause 2, wherein the first apparatus comprises a non-volatile memory element with volatile characteristics that match a form of fatigue or facilitation.

27. The system of clause 2, wherein the first apparatus comprises a digital CMOS circuit or an analog CMOS circuit.

28. A method for optimizing synaptic weights for a spike train generated by a given presynaptic neuron of a spiking neural network, the spike train being indicative of features of at least one timescale, the method comprising: for a timescale of the timescales tuning a respective time- and input-dependent synaptic efficacy for weighting the presynaptic spikes and providing the weighted presynaptic spikes into a respective postsynaptic neuron of the network.

29. A computer program product comprising a computer-readable storage medium having computer-readable program code embodied therewith, the computer-readable program code configured to implement the steps of the method according to clause 28.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating spikes by a neuron of a spiking neural network, the method comprising generating spikes, wherein the spike generation encodes at each time instant at least two variable values at the neuron by performing a mixed coding of said at least two variables, wherein the spikes generated at said each time instant include encodings of said at least two variables.

2. The method of claim 1, the two variables being encoded by the neuron using an instantaneous rate of spike generation and timing of each generated spike.

3. The method of claim 1, wherein timing of each generated spike of the spikes is determined by a degree of synchrony of the neuron's spikes to other spikes of other neurons of the spiking neural network.

4. The method of claim 2, wherein the generation of the spikes comprises: at time bin of duration dt, at least based on a predefined source of random numbers common to neurons in the spiking neural network, using a reference Poisson process for performing a Bernoulli trial of probability of success proportional to the instantaneous rate of spike generation and the duration dt; wherein at a given time bin, the neuron generates a spike with probability $\theta_k = R_k dt + \sqrt{c_k}(1-R_k dt)$ if the neuron's reference Bernoulli trial in the given bin is successful or probability $\phi_k = R_k dt(1-\sqrt{c_k})$, otherwise, where $c_k$ is a synchrony coefficient that determines a spike timing and $R_k$ is a determined spike rate of the neuron k.

5. The method of claim 1, the neuron being configured to generate a spike in accordance with rates for encoding respective values of a first property of a given object, and to generate a spike in accordance with timings for encoding respective values of a second property of the given object, the generating comprising: determining one of the rates and timings for spike generation of the at least two variable values; wherein the generated spikes have both the determined timing and the determined rate.

6. The method of claim 1, wherein the generation of the spikes results in a spike train having a rate and timing that are indicative of a first and second property respectively.

7. The method of claim 1, wherein the at least two variable values are at least two properties of an object.

8. The method of claim 7, where the object is a pixel of an image.

9. The method of claim 7, wherein the at least two variable values are color and brightness.

10. A neuromorphic neuron apparatus, the neuron apparatus being configured to generate spikes, the spike generation being configured to encode at least two variables at each time instant by performing a mixed coding of said at least two variables, wherein the spikes generated at said each time instant include encodings of said at least two variables.

11. The neuromorphic neuron apparatus of claim 10, comprising a digital CMOS circuit or an analog CMOS circuit or a memristive component.

12. A neuromorphic system comprising a set of neuron apparatuses of claim 10.

13. The system of claim 10, wherein timing of a spike generated by a neuron is determined by a degree of synchrony of said neuron's spikes to other neurons' spikes.

14. A computer program product comprising a computer-readable storage medium having computer-readable program code embodied therewith, the computer-readable program code configured to implement the steps of the method according to claim 1.

15. A synapse system for optimizing synaptic efficacies for weighting spike trains generated by presynaptic neurons of a spiking neural network, the spike trains encoding information in different timescales, wherein the spike trains generated at a time instant include encodings of at least two variables using a mixed coding of said at least two variables, wherein for each presynaptic neuron of the presynaptic neurons and for each timescale of the timescales the system is configured to tune a respective plastic synaptic efficacy for weighting an input spike and providing the weighted input to a postsynaptic neuron of the network.

16. The system of claim 15, wherein a plastic synaptic efficacy G(t) of the synaptic efficacies comprises a synaptic weight W(t) and a short-term function F(t), wherein the synapse system comprises a first apparatus associated with a given pair of presynaptic and postsynaptic neurons of the presynaptic and postsynaptic neurons, the first apparatus comprising a long-term synaptic plasticity component for tuning the synaptic weight W(t) and a short-term synaptic plasticity component for tuning the short-term function F(t).

17. The system of claim 16, the system being further configured for optimizing the plastic synaptic efficacy for another pair of presynaptic and postsynaptic neurons of the network, the system further comprising a second apparatus associated with the other pair, the second apparatus comprising a short-term synaptic plasticity component and a long-term synaptic plasticity component.

18. The system of claim 17, wherein the short-term synaptic plasticity component of the second apparatus is different from the short-term synaptic plasticity component of the first apparatus.

19. The system of claim 17, wherein the short-term synaptic plasticity component of the second apparatus is inactive.

20. The system of claim 17, wherein the first and second apparatuses are associated with a same postsynaptic neuron, wherein the short-term synaptic plasticity component of the second apparatus is the same as the short-term synaptic plasticity component of the first apparatus.

21. The system of claim 17, wherein the other pair of neurons comprises the presynaptic neuron of the pair of neurons.

22. The system of claim 17, wherein the long-term synaptic plasticity component, of at least one of the first apparatus and the second apparatus, is configured to determine changes to the respective synaptic weight W(t) depending on a time distance of spikes in pairs of presynaptic and postsynaptic spikes of the given pair, wherein the short-term synaptic plasticity component is configured to determine changes to the respective short-term function F(t) depending on a time of arrival of presynaptic spikes.

23. The system of claim 22, wherein short-term increases in presynaptic inputs induce short-term changes in the respective short-term function F(t) such that the plastic synaptic efficacy G(t) is decreasing or increasing in the short-term.

24. A method of optimizing synaptic weights for a spike train generated by a given presynaptic neuron of a spiking neural network, the spike train being indicative of features of at least one timescale, the method comprising:

for a timescale of the timescales, tuning a respective time-dependent and input-dependent synaptic efficacy for weighting presynaptic spikes to generate weighted presynaptic spikes and providing the weighted presynaptic spikes into a respective postsynaptic neuron of the network, wherein the spike train generated by the given presynaptic neuron at a time instant includes encodings of at least two variables encoded using a mixed coding.

25. A computer program product comprising a computer-readable storage medium having computer-readable program code embodied therewith, the computer-readable program code configured to implement the steps of the method according to claim 24.

* * * * *